United States Patent
Moulin et al.

(10) Patent No.: US 6,966,969 B2
(45) Date of Patent: Nov. 22, 2005

(54) ROTARY SONOTRODE ALLOWING CONTINUOUS WELDING OVER A LARGE WIDTH

(75) Inventors: Serge Moulin, Sury le Comtal (FR); Robert Combe, Sury le Comtal (FR)

(73) Assignee: Aplix, (FR)

( * ) Notice: Subject to any disclaimer, the term of this patent is extended or adjusted under 35 U.S.C. 154(b) by 66 days.

(21) Appl. No.: 10/313,470

(22) Filed: Dec. 5, 2002

(65) Prior Publication Data

US 2004/0005431 A1  Jan. 8, 2004

(30) Foreign Application Priority Data

Jun. 9, 2000 (FR) .................................... 00 07403
Jun. 5, 2001 (WO) ...................... PCT/FR01/01724

(51) Int. Cl.$^7$ ............................................ B29C 65/08
(52) U.S. Cl. .................................. 156/580.2; 16/580.1
(58) Field of Search ............................. 156/73.1, 580.1, 156/580.2; 228/1.1, 110.1; 264/442, 443, 264/444; 425/174.2

(56) References Cited

U.S. PATENT DOCUMENTS

| | | | |
|---|---|---|---|
| 5,403,413 A | | 4/1995 | Masuda ...................... 156/66 |
| 5,645,681 A | * | 7/1997 | Gopalakrishna et al. . 156/580.2 |
| 5,707,483 A | | 1/1998 | Nayar et al. .............. 156/580.2 |
| 5,922,170 A | * | 7/1999 | Gerdes et al. ............ 156/580.2 |
| 5,976,316 A | * | 11/1999 | Mlinar et al. ............ 156/580.2 |
| 6,059,923 A | * | 5/2000 | Gopalakrishna .......... 156/580.2 |
| 6,540,854 B2 | * | 4/2003 | Couillard et al. ............. 156/64 |
| 6,877,975 B2 | * | 4/2005 | Wuchinich ................ 425/174.2 |

FOREIGN PATENT DOCUMENTS

| | | | |
|---|---|---|---|
| CH | 671 529 A5 | 9/1989 | ............ B06B 1/06 |
| EP | 0 457 187 A2 | 11/1991 | ........... B29C 65/08 |
| EP | 0 665 083 A1 | 8/1995 | ............ B24B 1/04 |
| FR | 2 743 929 | 7/1997 | .......... G10K 11/02 |

OTHER PUBLICATIONS

Database WPI Section Ch., Week 199040, Derwent Publications Ltd., London, GB; Class A35, AN 1990-303477; XP002154199 & SU 1 548 072 A (OMSK POLY), Mar. 7, 1990 (1 SHEET).

* cited by examiner

*Primary Examiner*—James Sells
(74) *Attorney, Agent, or Firm*—Renner, Kenner, Greive, Bobak, Taylor & Weber

(57) ABSTRACT

A rotary sonotrode enabling welding to be carried out continuously over a large width.

A sonotrode (S) more particularly of revolution, made of a first material for propagation of ultrasonic waves, more particularly metal, comprising a axial bar (2) and an active part (4) connected to the axial part (2), the bar extending uninterruptedly over the entire axial extent of the sonotrode, and a chamber (8), made of a second material which does not allow the transmission of ultrasonic waves from the first material to the second, the second material being more particularly air or avoid, is interposed between the bar (2) and the active part (4).

11 Claims, 3 Drawing Sheets

ROTARY SONOTRODE ALLOWING CONTINUOUS WELDING OVER A LARGE WIDTH

This application is a continuation of international application PCT/FR01/01724, filed on Jun. 5, 2001, which designated the U.S. and was not published in English.

This invention relates to a sonotrode, more particularly of revolution, made of a material allowing the propagation of ultrasonic waves, comprising an axial bar intended to receive longitudinal vibrations from an ultrasonic transmitter, an active part connected to the bar and intended to be subject to radial vibrations and means for fixing each end of the bar either to an ultrasonic motor or to a fixed support platform.

The invention also relates to an ultrasonic welding device comprising a sonotrode of this type.

The invention also relates to an assembly of two sheets, strips or tapes welded to one another by an ultrasonic welding device according to the invention. The two sheets or tapes consist more particularly of a strip of thermoplastic material on the one hand, from which hooks extend, and on the other hand a plastic or elastic film, the assembly being used more particularly for the production of self-fastening elements in the area of pilches. Other possible areas of application of the invention are lightweight or very lightweight webs of the nonwoven type (nonwoven film for the agricultural industry and medical protection), the area of manufacture of protective garments based on thermofusible technical fabric, the area of connecting plastic films with the insertion of a copper wire (flat cable assembly), the area of joining materials together, for example prefixing of the thermofusible product, and other similar areas.

The document DE-A-1 704 178 published Apr. 22, 1971, already discloses a sonotrode of revolution of the above type. FIG. 2 of this document, for example, shows the sonotrode consisting of an axial bar fixed at one of its ends (A) to an ultrasonic motor intended to subject it to longitudinal vibrations and an active part (K) subjected to radial vibrations. Taking into account the geometry of the sonotrode, the useful width of the active part, i.e. the dimension in the transverse plane parallel to the axis of the bar, is small, being no more than a few millimetres, 8 to 9 millimetres at maximum.

Also, FIG. 3 of this document also shows an axial bar connected at its end (A) to a motor producing axial vibrations and an active part (K) subjected to radial vibrations. The useful width of the active part is also very small, being no more than a few millimetres. Taking its geometry into account, the sonotrode overall is very fragile. It can break particularly in the event of excessive vibration. This is further accentuated by the fact that it is fixed to a motor at only one of its ends, being overhung. The structure of the sonotrode in FIG. 3 compared with that shown in FIG. 2 enables more pronounced radial components to be obtained in the vibration of the active part, and hence an active part having greater radial vibrations and hence better welding. However, with respect to the structure of FIG. 2, this is obtained to the detriment of the strength of the sonotrode overall, and the active part can have only small useful widths.

The document FR 7 007 538 also discloses a sonotrode according to the preamble of claim 1. The sonotrode is solid and the useful part has only a small width.

The object of this invention is to obviate the above disadvantages of the prior art by proposing a sonotrode having both a large useful width for its active part and high strength.

According to the invention, a sonotrode, more particularly of revolution, made of a first material for propagation of ultrasonic waves, more particularly metal, comprises an axial bar, an active part connected to the axial bar and means for fixing each of the bar ends to a motor producing axial or longitudinal ultrasonic vibrations and/or to a fixed supporting platform, and is characterised in that the bar extends uninterruptedly over the entire axial extent of the sonotrode, and a chamber made of a second material which does not allow the transmission of ultrasonic waves from the first material to the second material is interposed between the bar and the active part.

Thus because the axial bar extends over the entire axial extent of the sonotrode, the effect obtained compared with the prior art and particularly compared with FIG. 3 of the above-cited document is that the sonotrode is very strong and can withstand radial vibrations of large amplitude. In the prior art, either the bar extended uninterruptedly over the axis and there was considerable strength but small amplitudes of the radial vibrations and hence a small width, or else the axial or longitudinal vibrations were completely transferred to the active part by bars of small cross-sections by preventing the transfer of any longitudinal vibrations along the axial bar beyond the active part, and this resulted in large radial vibrations but a very mediocre strength for the assembly so that it was not possible either to provide a useful width for the active part to allow large welding widths. The applicants, realising for the first time that it was not necessary to transfer all the longitudinal waves to the active part and that some of the axial waves could be propagated by the centre, retaining the uninterrupted continuous aspect of the axial bar, thus for the first time enable a sonotrode of the above type to be obtained with a very large useful width for the active part.

According to a preferred embodiment of the invention, the useful width of the active part is greater than 15 mm, more particularly greater than 25 mm, and preferably more particularly greater than 40 mm.

According to an improvement of the invention, the active part and the means for connecting the axial bar to the active part have the shape of a T in longitudinal cross-section. This results in a particularly good transfer of the longitudinal vibrations into radial vibrations while having excellent strength for the sonotrode.

According to an improvement of the invention, the T formed by an upright and a cross-bar has a deadhead at the ends of the cross-bar.

According to a preferred embodiment of the invention, the cross-section of the means for connecting the active part to the axial bar is substantially equal to the axial cross-section of the axial bar.

The invention also relates to an ultrasonic welding device comprising a sonotrode according to the invention connected at one or both ends to an ultrasonic generating motor, possibly with the interposition of an amplifier or booster, the two sheets intended to be ultrasonically welded being interposed between the active part of the sonotrode and the outer surface of a roller.

The invention also relates to an assembly of two sheets, strips or tapes welded by an ultrasonic weld along a first direction, the weld extending also in a second direction, perpendicular to the first direction, over a shorter distance than in the first direction, characterised in that the weld extends without any discontinuity or interface in the second direction over more than 10 mm, more particularly more than 25 mm and preferably more than 40 mm.

According to a preferred embodiment of the invention, one of the two sheets is a strip of thermoplastic material provided with hooks and the other sheet is an elastic film.

Thus the assembly of two welded sheets is of a very low weight, for example less than 20 g/m$^2$ and even less than 15 g/m$^2$.

The invention also relates to a pilch comprising a self-fastening device of which the male part comprises an assembly of two sheets, strips or tapes according to the invention.

The drawings, which are given solely by way of example, describe preferred embodiments of a sonotrode according to the invention.

Figure 1:
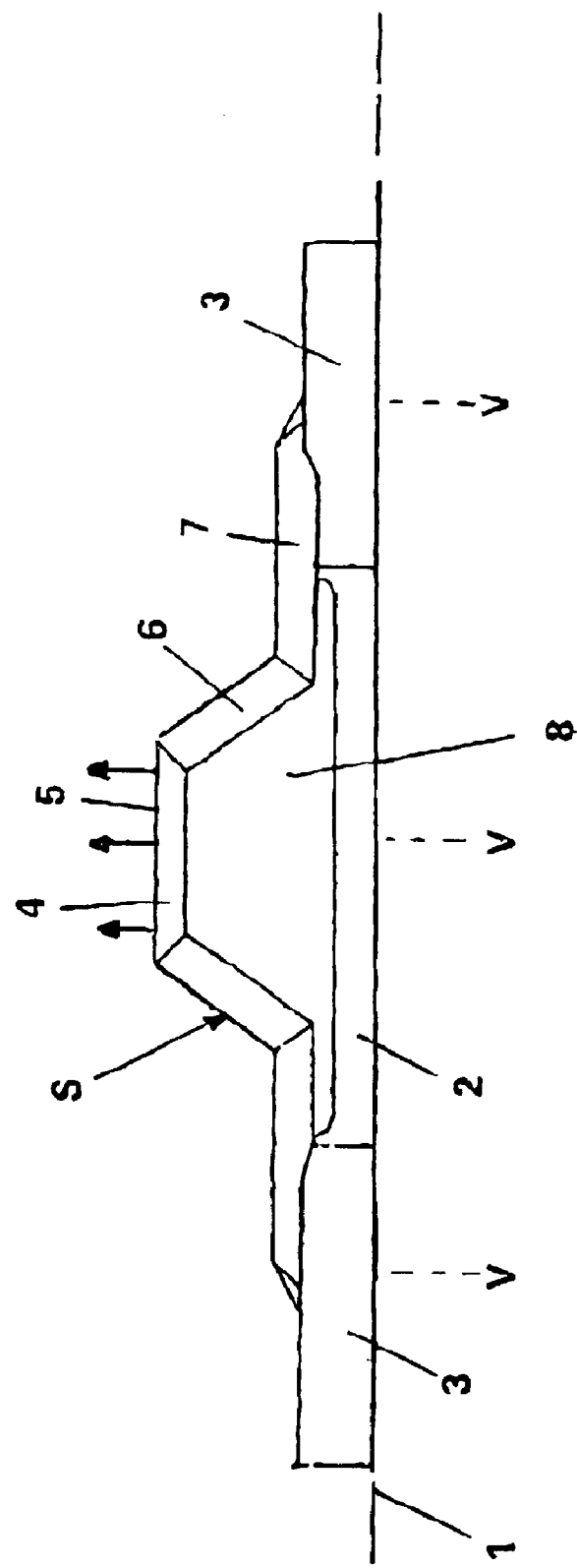
FIG. 1 illustrates a first embodiment of a sonotrode of revolution according to the invention in a longitudinal cross-section.

FIG. 1 is a developed longitudinal cross-section of a sonotrode of revolution according to the invention. The sonotrode S consists of a circular cylindrical bar 2 of axis 1, of metal, for example steel, which allows propagation of ultrasonic waves. The two ends 3 of the bar 2 are of larger diameter than the rest of the cylinder 2. These ends 3 are connected to an ultrasonic transmitter (not shown) which is well known in the art. A booster or amplifier for the ultrasonic vibrations can also be provided between the ultrasonic transmitter and the ends 3.

The sonotrode S also comprises an active part 4 of the same material as that of the bar 2. This active part has a circular annular shape. In the plan view shown in the drawing, the outer surface 5, which is the useful surface of the active part, is a straight line. It would be possible to provide other shapes, particularly slightly curved or of sinusoidal shape. The active part 4 is of a thickness less than the thickness of the axial bar 2. The active part 4 is connected to the ends 3 of the axial bar 2 by connecting parts 6 and 7, the same material as the part 2. These connecting parts 6 and 7 are also of revolution with respect to the axis 1 of the drawing. The first connecting part 7 is a circular cylinder of axis parallel to the axis 1 of the bar, while the second connecting part 6 is frusto-conical. In longitudinal cross-section, i.e. in the plane of FIG. 1, the second connecting part 6 is inclined with respect to the first connecting part 7. The second connecting part 6 is also inclined with respect to the active part 4.

The active part 4, the connecting parts 6 and 7 and the axial bar 2 define an inner chamber 8 separating the axial bar 2 from the active part 4. The chamber 8 may be empty or filled with a material which does not allow the transmission of ultrasonic waves from the material of the bar 2 towards the material in question, more particularly filled with air.

The ultrasonic vibrations produced by the ultrasonic transmitter are propagated axially in the sonotrode. The vibration nodes are situated at the ends of the axial bar 2 and substantially at the middle of the active part 4, the sonotrode thus operating in the half wavelength, its total length corresponding to three half wavelengths of the frequency of the ultrasonic waves used, each amplitude node being a radial dilation antinode (compression-extension effect). It would have been possible to provide a larger number of half wavelengths, for example five or seven, etc. The longitudinal or axial waves are propagated by the connecting parts 6 and 7 and are converted to radial vibrations (see the arrows extending from part 4 in FIG. 1), which will allow ultrasonic welding to be carried out (release of thermal energy) at the active part 4 between two sheets 9 and 10 (see FIG. 3) which are passed over the active part 4 by means of a roller (not shown) which bears on the two sheets to bring them into contact with one another and with the active part 4.

The diameter of the axial bar 7 in its central thin part is 13.5 mm. The diameter of the two ends 3 is 20 mm. The thickness in the plane of FIG. 1 of the connecting part 7 is 6 mm. The thickness of the connecting part 6 is 8 mm. The thickness of the active part 4 is 5 mm.

The angle formed between the first connecting part 7 and the second connecting part 6 is about 125°. The outside diameter of the circular ring formed by the active part 4 is 70 mm. The useful width of the active part 4, i.e. the dimension parallel to the longitudinal axis 1, is 40 mm.

According to another possible embodiment, the active part 4 is in the form of a cube or a rectangular parallelepiped. Similarly, the axial bar 2 may also have a square or rectangular cross-section.

Figure 2:
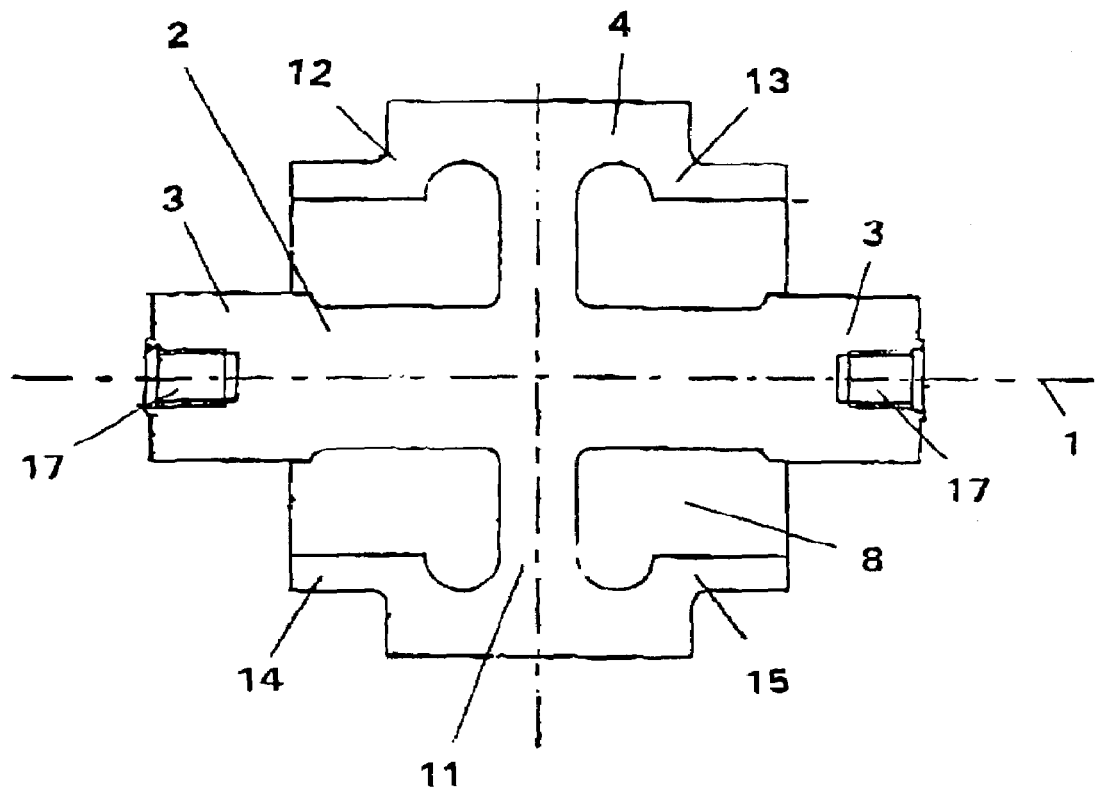
FIG. 2 is a longitudinal cross-section of a second embodiment of a sonotrode according to the invention.

FIG. 2 illustrates a second preferred embodiment of the invention. The same numerical references denote identical parts, particularly the axial bar 2, the end parts 3 and the active part 4. The active part is connected to the axial cylinder 2 by a connecting part 11 extending from the axial cylinder 2 and perpendicular thereto. The active part 4 and the connecting part 11 in the shape of a disc form a solid torus, the longitudinal cross-section of which has the shape of a T. The two ends 12, 13 of the cross-bar of the T comprise extensions forming a deadhead 14, 15. These two extensions 14 and 15 form circular rings of smaller diameter than the diameter of the circular ring forming the active part 4. An empty space 8 is formed between the axial bar 2 and the cross-bar of the T and could if required be filled with a material which does not allow the transmission of waves from the bar to the material in question.

The axial bar 2 extends axially over 100 mm, of which 35 mm is axial extension of the two ends 3. The transfer disc 11 has a thickness (dimension parallel to the axis 1) of 10 mm and an outside diameter of 78 mm. The two deadheads each have an outside diameter of 60 mm and an inside diameter of 50 mm. The outside diameter of the bar 2 at its thinnest central part is 20 mm while the ends 3 have a diameter of 23.5 mm.

Fixing means 17, for example in the form of a tapped hole to allow the introduction of a shaft of a motor, are provided at the two ends of the axial bar or hub 2.

Each fixing means can receive an ultrasonic motor, or alternatively one of the means can receive an ultrasonic motor while the other receives a fixed support platform or shaft.

The angles formed between the transfer disc 11 and the axial bar 2 can be rounded to assist the propagation of the ultrasonic waves. Similarly, the angles formed at the intersection of the upright of the T and the cross-bar of the T can be rounded. Finally, the angles formed between the deadheads and the cross-bar can also be rounded for the same purpose.

According to another possible embodiment, the active part 4 is in the form of a cube or a rectangular parallelepiped and the connecting part 11 has the shape of a rectangular or square parallelepiped, the cross-section of the system also having the shape of a T.

Figure 3:
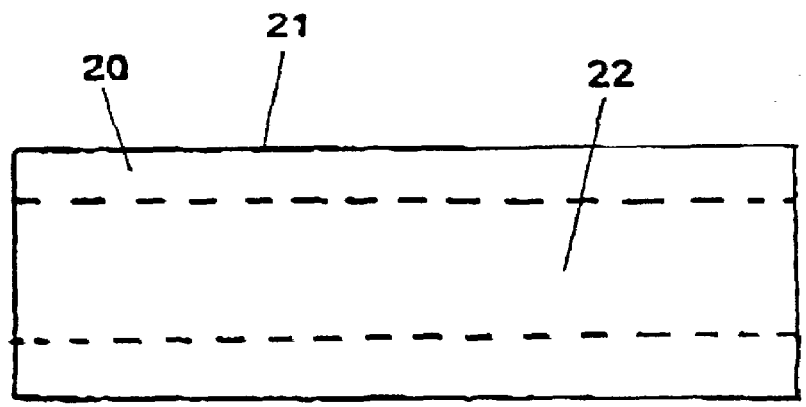
FIG. 3 shows an assembly of two sheets welded by an ultrasonic weld according to the invention.

FIG. 3 shows two oblong sheets welded to one another by a welding device of the kind described above. The two sheets 20 and 21 are welded at the weld 22 (defined by broken lines). The weld 22 extends over the entire length of the two sheets and also extends over part of the width of the two sheets. The width extent of the weld is smaller than its length. The width extent of the weld is greater than 10 mm, preferably greater than 25 mm and even more preferably greater than 40 mm. In cross-section parallel to the width of the weld there is no discontinuity or gap along the weld. The weld is continuous over its entire width.

Figure 4:
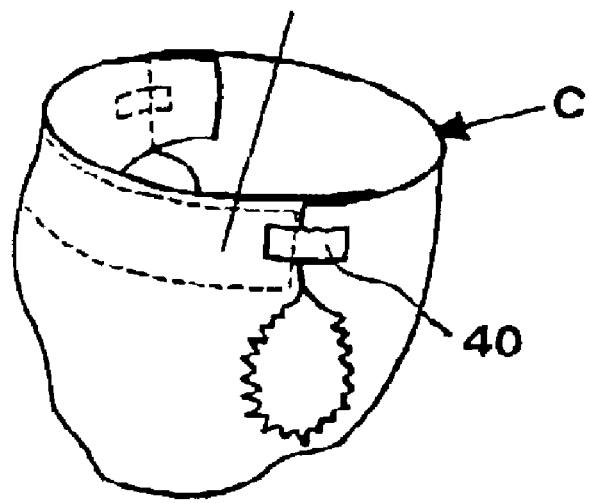
FIG. 4 shows a pilch comprising a self-fastening part comprising an assembly of two sheets according to the invention.

FIG. 4 shows a pilch (C) having a self-fastening device comprising a female loop part 30 and a male part 40. The male part 40 comprises a strip of thermoplastic material 41, from which hooks extend, and which is welded by ultrasound to an elastic film 42.

Figure 5:
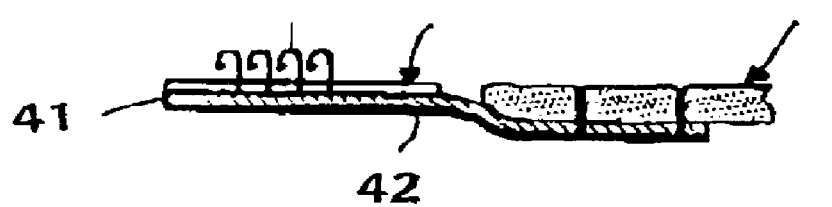
FIG. 5 is a section of a male part of the self-fastening part of FIG. 4.

FIG. 5 shows the strip 41 containing hooks and thermowelded on one of its surfaces to the elastic film 42.

The strip 41 is of thermoplastic material, for example polyethylene. The film 42 is, for example, a nonwoven, a felt, a jersey, a velvet or an elastic material.

What is claimed is:

1. A sonotrode, for propagation of ultrasonic waves, comprising a solid axial bar made of a first material, an active part and a connecting part also made of said first material, said connecting part connecting said axial bar and said active part and being integral therewith, means for fixing each of the ends of said axial bar to a motor producing ultrasonic vibrations and/or to a supporting platform, said axial bar extending uninterruptedly over the entire axial extent of the sonotrode, and a chamber including a portion which does not allow the transmission of ultrasonic waves, said portion being interposed between said axial bar and said active part, wherein said connecting part has a thickness in a direction parallel to the axis of said axial bar less than the diameter of said axial bar.

2. A sonotrode according to claim 1, wherein the useful width of said active part is greater than approximately 15 mm.

3. A sonotrode according to claim 1, wherein said thickness of said connecting part is substantially equal to half that of the diameter of said axial bar.

4. A sonotrode according to claim 1, wherein said active part and said means for connecting said axial bar to said active part form a torus, the cross-section of which has the shape of a T.

5. A sonotrode according to claim 4, further comprising a deadhead which extends from each end of the cross-bar of the T.

6. An ultrasonic welding device, comprising a sonotrode according to claim 1, wherein at least one ultrasonic motor is fixed to at least one of the two ends of said axial bar and wherein an amplifier is interpositioned between said axial bar and said motor.

7. A sonotrode according to claim 1, wherein said first material is metal.

8. A sonotrode according to claim 1, wherein said portion is filled with air.

9. A sonotrode according to claim 1, wherein said axial bar is substantially symmetric about a longitudinal axis.

10. A sonotrode according to claim 1, wherein said sonotrode is substantially symmetric about a longitudinal axis.

11. A sonitrode, for propogation of ultrasonic waves, comprising a solid axial bar made of a first material, an active part connected to said axial bar and also made of the first material, means for fixing each of the ends of said axial bar to a motor producing ultrasonic vibrations and/or to a supporting platform, said axial bar extending uninterruptedly over the entire axial extent of the sonitrode, and an enclosed chamber including a portion which does not allow the transmission of ultrasonic waves, said portion being interposed between said axial bar and said active part.

* * * * *